(12) United States Patent
Huang et al.

(10) Patent No.: US 11,620,022 B1
(45) Date of Patent: Apr. 4, 2023

(54) FLOATING TOUCH DISPLAY DEVICE

(71) Applicant: TPK Touch Solutions (Xiamen) Inc., Fujian (CN)

(72) Inventors: Chun-Jung Huang, Taoyuan (TW); En-Chia Chang, Taipei (TW); Shang-Yu Lin, Hsinchu County (TW); Chih-Cheng Chuang, Hsinchu County (TW); Sun-Po Lin, Hsinchu County (TW); Tai-Shih Cheng, Taipei (TW)

(73) Assignee: TPK Touch Solutions (Xiamen) Inc., Fujian (CN)

( * ) Notice: Subject to any disclaimer, the term of this patent is extended or adjusted under 35 U.S.C. 154(b) by 0 days.

(21) Appl. No.: 17/743,502

(22) Filed: May 13, 2022

(51) Int. Cl.
| | |
|---|---|
| *G06F 3/042* | (2006.01) |
| *G06F 3/044* | (2006.01) |
| *G06F 1/16* | (2006.01) |
| *G06F 3/041* | (2006.01) |
| *G06F 3/045* | (2006.01) |

(52) U.S. Cl.
CPC .......... *G06F 3/0421* (2013.01); *G06F 1/1656* (2013.01); *G06F 3/044* (2013.01); *G06F 3/045* (2013.01); *G06F 3/0412* (2013.01)

(58) Field of Classification Search
None
See application file for complete search history.

(56) References Cited

U.S. PATENT DOCUMENTS

| | | | |
|---|---|---|---|
| 2015/0277636 A1* | 10/2015 | Holmgren | G06F 3/0421 345/175 |
| 2022/0308693 A1* | 9/2022 | Edo | G06F 3/013 |

FOREIGN PATENT DOCUMENTS

CN 113625901 A 11/2021

\* cited by examiner

*Primary Examiner* — Stephen T. Reed
(74) *Attorney, Agent, or Firm* — Cooper Legal Group, LLC

(57) ABSTRACT

The disclosure provides a floating touch display device which includes a capacitive touch panel, a display device, an interval layer, and an optical-lens structure. The capacitive touch panel is configured to provide a floating touch surface at a floating height above a first surface. The display device includes a second surface, and the display device is configured to provide a display image from the second surface. The optical-lens structure is disposed between the capacitive touch panel and the display device. The interval layer is disposed between the second surface and the optical-lens structure, and a first optical distance is between the second surface and the optical-lens structure. The optical-lens structure is configured to image the display image on the floating touch surface at a second optical distance, and the first optical distance is equal to the second optical distance.

10 Claims, 12 Drawing Sheets

FLOATING TOUCH DISPLAY DEVICE

BACKGROUND

Field of Disclosure

The disclosure relates to a floating touch display device, particularly to a floating touch display device with a floating touch surface.

Description of Related Art

In electronic product techniques nowadays, with the improvement of floating touch technology, how to improve a floating display image is an important issue in this field.

In some art, such as China Pat. No. CN113625901A, a touch display device with floating touch functions is disclosed. However, such art only discloses that the light directly enters into the imaging unit through the optical unit, and then the imaging unit generates the floating image. Hence, such art does not disclose that disposing of an interval layer between the optical unit and the imaging unit is required, so as to adjust the object distance of the imaging unit. In this case, the floating image may out of focus.

Therefore, the present disclosure provides a floating touch display device able to improve the clarity of the floating image.

SUMMARY

One embodiment of the present disclosure provides a floating touch display device. The floating touch display device includes a capacitive touch panel, a display device, an optical lens structure, and an interval layer. The capacitive touch panel includes a first surface. The capacitive touch panel is configured to provide a floating touch surface at a floating height above the first surface. The display device includes a second surface. The display device is configured to provide a display image at the second surface. The optical lens structure is disposed between the capacitive touch panel and the display device. The interval layer is disposed between the second surface and the optical lens structure to space the second surface and the optical lens structure at a first optical distance. The optical lens structure is configured to image the display image on the floating touch surface at a second optical distance, wherein the first optical distance is equal to the second optical distance.

The other embodiment of the present disclosure provides a floating touch display device. The floating touch display device includes a capacitive touch panel, a display device, an optical lens structure, and an interval layer. The capacitive touch panel is configured to provide a floating touch surface. The display device is configured to provide a display image. The capacitive touch panel is disposed between the optical lens structure and the display device. The interval layer is disposed between the display panel and the optical lens structure to space the second surface and the optical lens structure at a first optical distance. The optical lens structure is configured to image the display image on the floating touch surface at a second optical distance, wherein the first optical distance is equal to the second optical distance.

In summary, the interval layer is disposed between the optical lens structure and the display device of the floating touch display device of the present disclosure in order to improve the clarity of the floating image and the floating performance.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the diagrams, some of the conventional structures and elements are shown with schematic illustrations.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

In this document, the term "coupled" may also be termed "electrically coupled," and the term "connected" may be termed "electrically connected." "Coupled" and "connected" may also be used to indicate that two or more elements cooperate or interact with each other. In the following description and in the claims, the terms "include"

and "comprise" are used in an open-ended fashion, and thus should be interpreted to mean "include, but not limited to." As used herein, the term "and/or" includes any and all combinations of one or more of the associated listed items.

Figure 1:
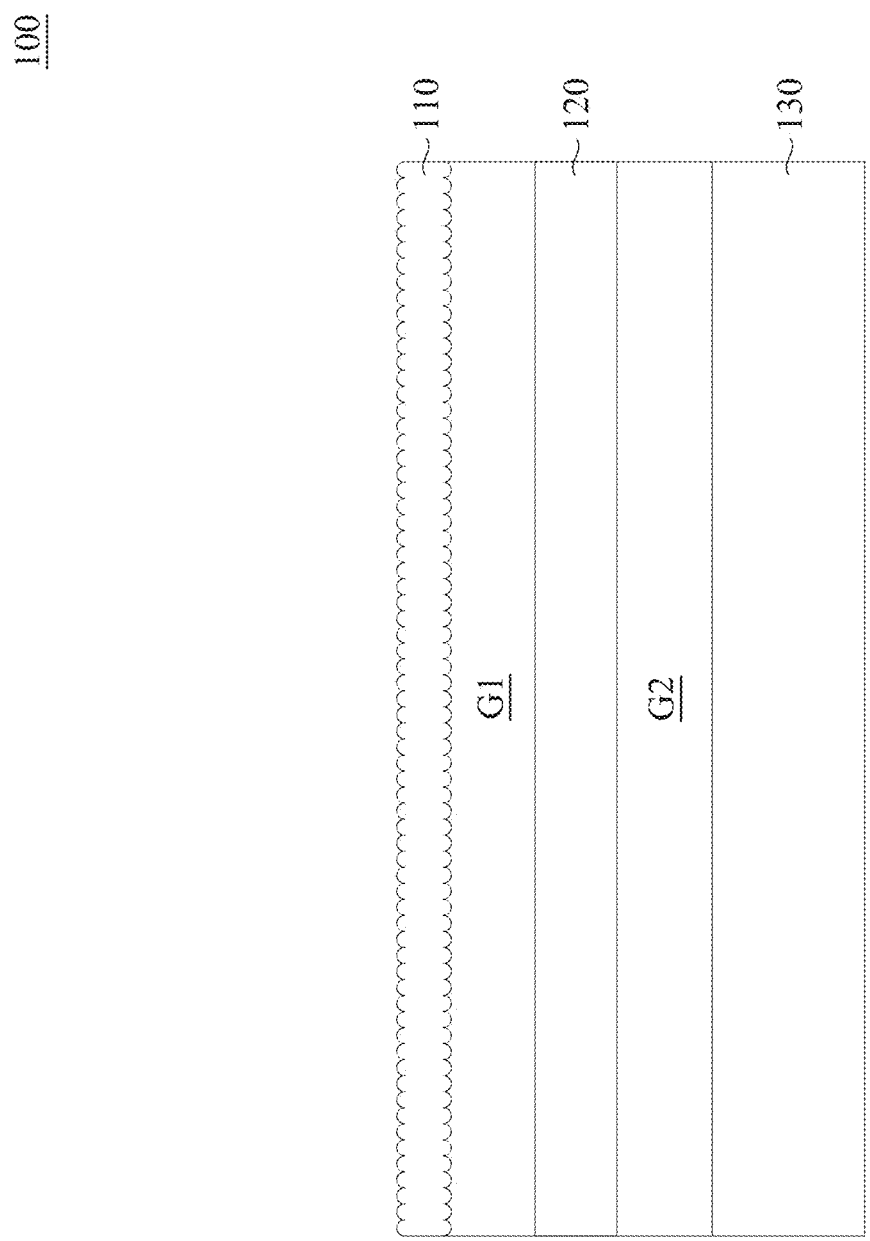
FIG. 1 is a schematic diagram of a floating touch device in accordance with one embodiment of the present disclosure.

A description is provided with reference to FIG. 1. FIG. 1 is a schematic diagram of a floating touch display device 100 in accordance with one embodiment of the present disclosure. As shown in FIG. 1, the floating touch display device 100 includes an optical lens structure 110, a capacitive touch panel 120, a display device 130, and connection layers G1 and G2. The capacitive touch panel 120 is configured to provide a floating touch surface. In some embodiments, the capacitive touch panel 120 can be implemented by projected capacitive touch panel. The architecture of the capacitive touch panel 120 can be implemented by Glass-Film-Film (GFF) technique, Film-Film (FF) technique, Glass-Glass (GG) touch technique, or One Glass Solution (OGS) technique. Therefore, it is not intend to limit the present disclosure.

In some embodiments, the display device 130 can be implemented by a display panel. In some embodiments, a specification of the aforesaid display panel can be implemented by Full High-Definition (HD) (such as, the specification with resolution of 1920×1080/2K). In some embodiments, a specification of the aforesaid display panel can be implemented by Ultra HD (such as, the specification with resolution of 1920×1080/4K or 7680×4320/8K). Therefore, it is not intend to limit the present disclosure.

In some embodiments, the optical lens structure 110 can be implemented by single-sided micro-lens array. In other embodiments, the optical lens structure 110 can be implemented by double-sided micro-lens array.

In structure, the optical lens structure 110 is disposed in the top layer in the floating touch display device 100, and the capacitive touch panel 120 is disposed between the optical lens structure 110 and the display device 130. The connection layer G1 is configured to connect the optical lens structure 110 to display device 130. For better understanding, a description is provided with reference to FIGS. 2A-2D.

Figure 2A:
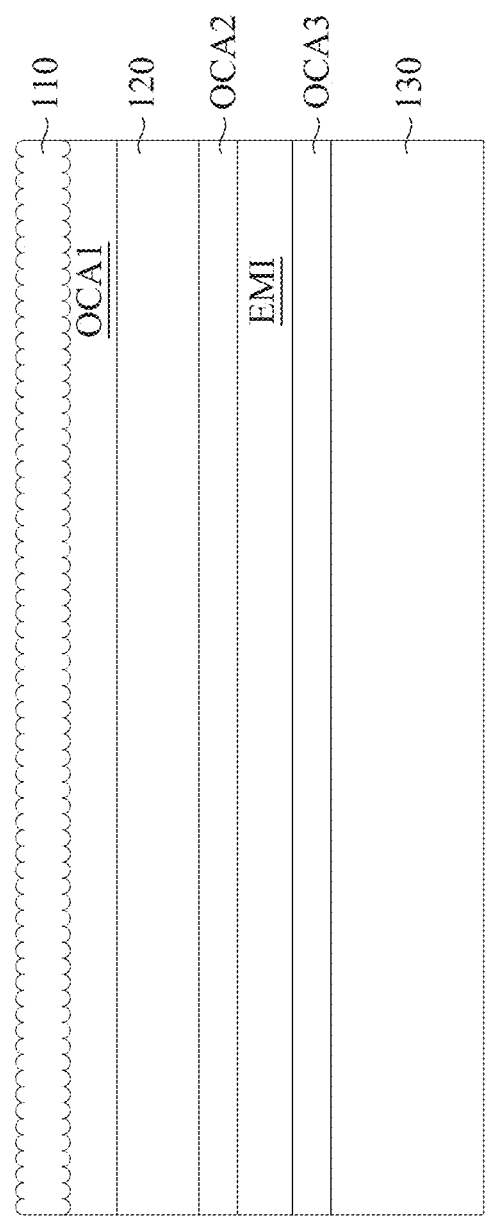
FIGS. 2A to 2D are schematic diagrams of floating touch devices in accordance with some embodiments of the present disclosure.

FIGS. 2A to 2D are schematic diagrams of floating touch devices 100a-100d in accordance with some embodiments of the present disclosure. As shown in FIG. 2A, the floating touch display device 100a includes an optical lens structure 110, a capacitive touch panel 120, a display device 130, optical cement layers OCA1-OCA3, and an electromagnetic interference suppression layer EMI.

In the embodiment illustrated in FIG. 2A, the optical lens structure 110 and the capacitive touch panel 120 are attached by the optical cement layer OCA1. The optical cement layers OCA2-OCA3 and the electromagnetic interference suppression layer EMI are disposed between the capacitive touch panel 120 and the display device 130. The electromagnetic interference suppression layer EMI is configured to increase the signal-to-noise ratio.

Figure 2B:
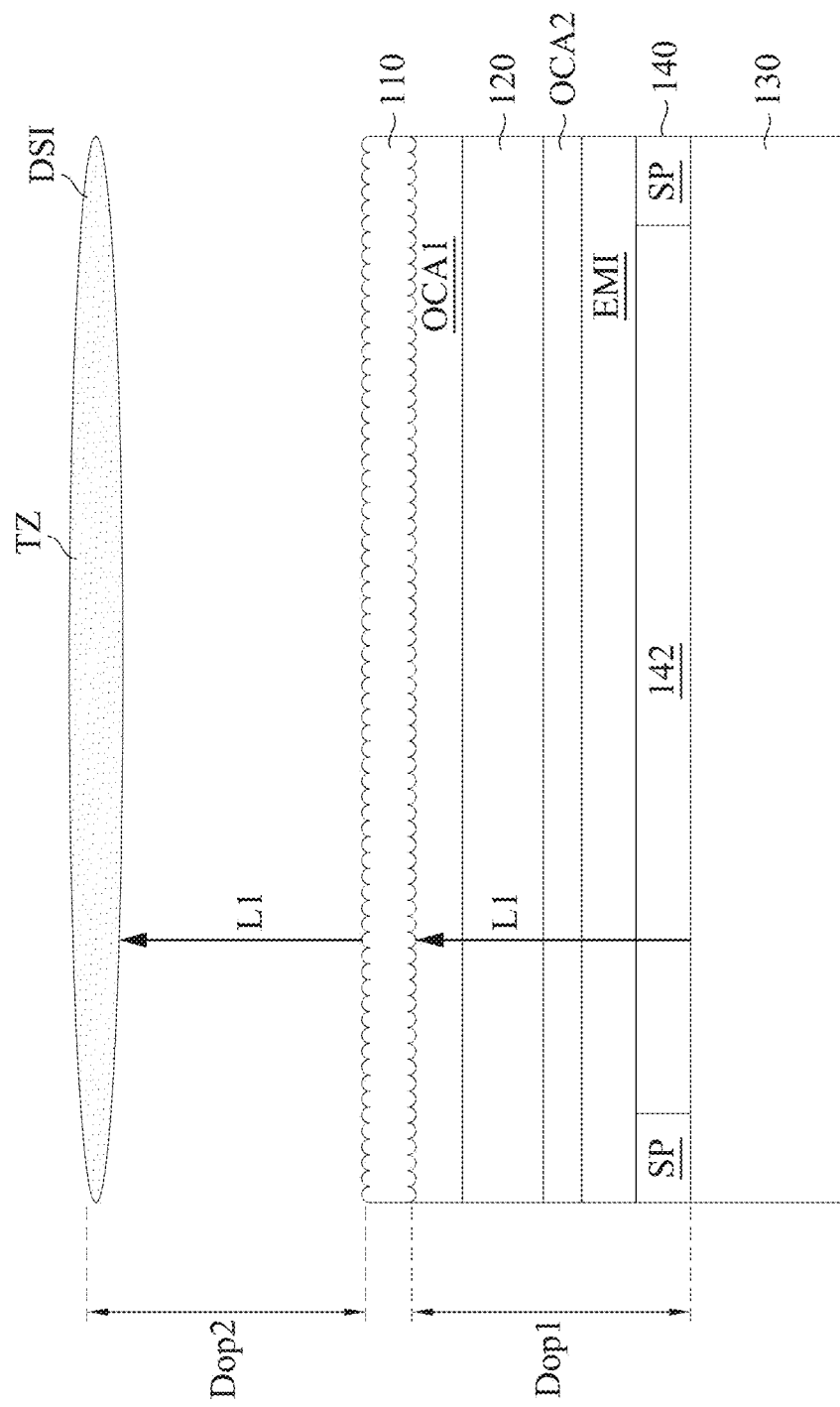

In the embodiment illustrated in FIG. 2B, the floating touch display device 100b includes an optical lens structure 110, a capacitive touch panel 120, a display device 130, optical cement layers OCA1-OCA2, an electromagnetic interference suppression layer EMI, and an interval layer 140. In structure, the capacitive touch panel 120 is disposed between the optical lens structure 110 and the display device 130. Compared to the floating touch display device 100a of the embodiment in FIG. 2A, the difference with respect to the floating touch display device 100b of the embodiment in FIG. 2B is that the optical cement layer OCA3 is replaced by the interval layer 140.

Specifically, the interval layer 140 is disposed between the capacitive touch panel 120 and the display device 130. The interval layer 140 includes an interval structure SP. In some embodiments, the interval structure SP can be implemented by a support structure (such as, rubber) or the optical cement. The interval structure SP is disposed along the outer edges of the display device 130 and the optical lens structure 110, such that a gap 142 can be formed between the display device 130 and the optical lens structure 110.

Since the interval layer 140 is disposed between the capacitive touch panel 120 and the display device 130, a first optical distance Dop1 between a display surface of the display device 130 and the optical lens structure 110 can be adjusted, such that the first optical distance Dop1 can be adjusted to be equal to a second optical distance Dop2 between a floating touch surface TZ provided by the capacitive touch panel 120 and the capacitive touch panel 120.

Therefore, a light L1, from the display image provided by the display surface of the display device 130, can be reflected to a position at the same height as the floating touch surface TZ by the optical lens structure 110 to generate the floating image DSI. Since the interval layer 140 can adjust the first optical distance Dop1 to be equal to the second optical distance Dop2, a size ratio of the floating image DSI and the display image can be 1:1, so as to display the original image provided by the display device 130.

The other configuration relationship and operation manner in the floating touch display device 100b are substantially equal to the floating touch display device 100a of the embodiment in FIG. 2A, and the description is omitted.

Figure 2C:
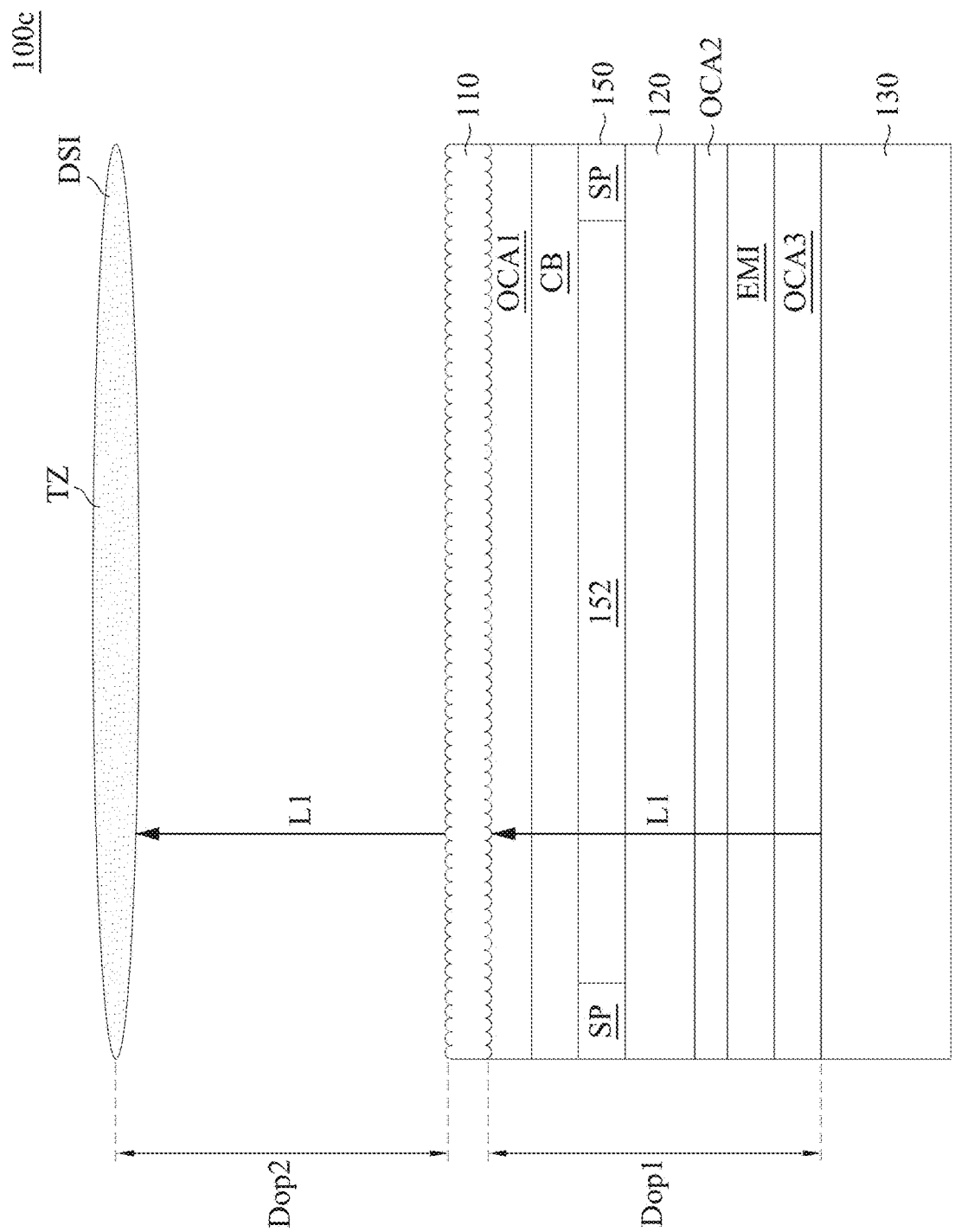

In the embodiments in FIG. 2C, the floating touch display device 100c includes an optical lens structure 110, a capacitive touch panel 120, a display device 130, optical cement layers OCA1-OCA3, an electromagnetic interference suppression layer EMI, a carrier board CB, and an interval layer 150. Compared to the floating touch display device 100a of the embodiment in FIG. 2A, the difference with respect to the floating touch display device 100c of the embodiment in FIG. 2C is that an interval layer 150 is disposed between the optical lens structure 110 and the capacitive touch panel 120. The interval layer 150 includes an interval structure SP.

Specifically, the optical cement layer OCA1 is disposed on the carrier board CB, and the interval structure SP is disposed along outer edges of the carrier board CB and the optical lens structure 110, so as to form a gap 152 between the carrier board CB and the optical lens structure 110.

Since the interval layer 150 is disposed between the capacitive touch panel 120 and the optical lens structure 110, a first optical distance Dop1 between a display surface of the display device 130 and the optical lens structure 110 can be adjusted to be equal to a second optical distance Dop2 between a floating touch surface TZ provided by the capacitive touch panel 120 and the optical lens structure 110. Therefore, a light L1, from the display image provided by the display surface of the display device 130, can be reflected to a position at the same height as the floating touch surface TZ by the optical lens structure 110 to generate the floating image DSI. Since the interval layer 150 can adjust the first optical distance Dop1 to be equal to the second optical distance Dop2, a size ratio of the floating image DSI and the display image can be 1:1, so as to display the original image provided by the display device 130.

The other configuration relationship and operation manner in the floating touch display device 100c are substantially equal to the floating touch display device 100a of the embodiment in FIG. 2A, and the description is omitted.

Figure 2D:
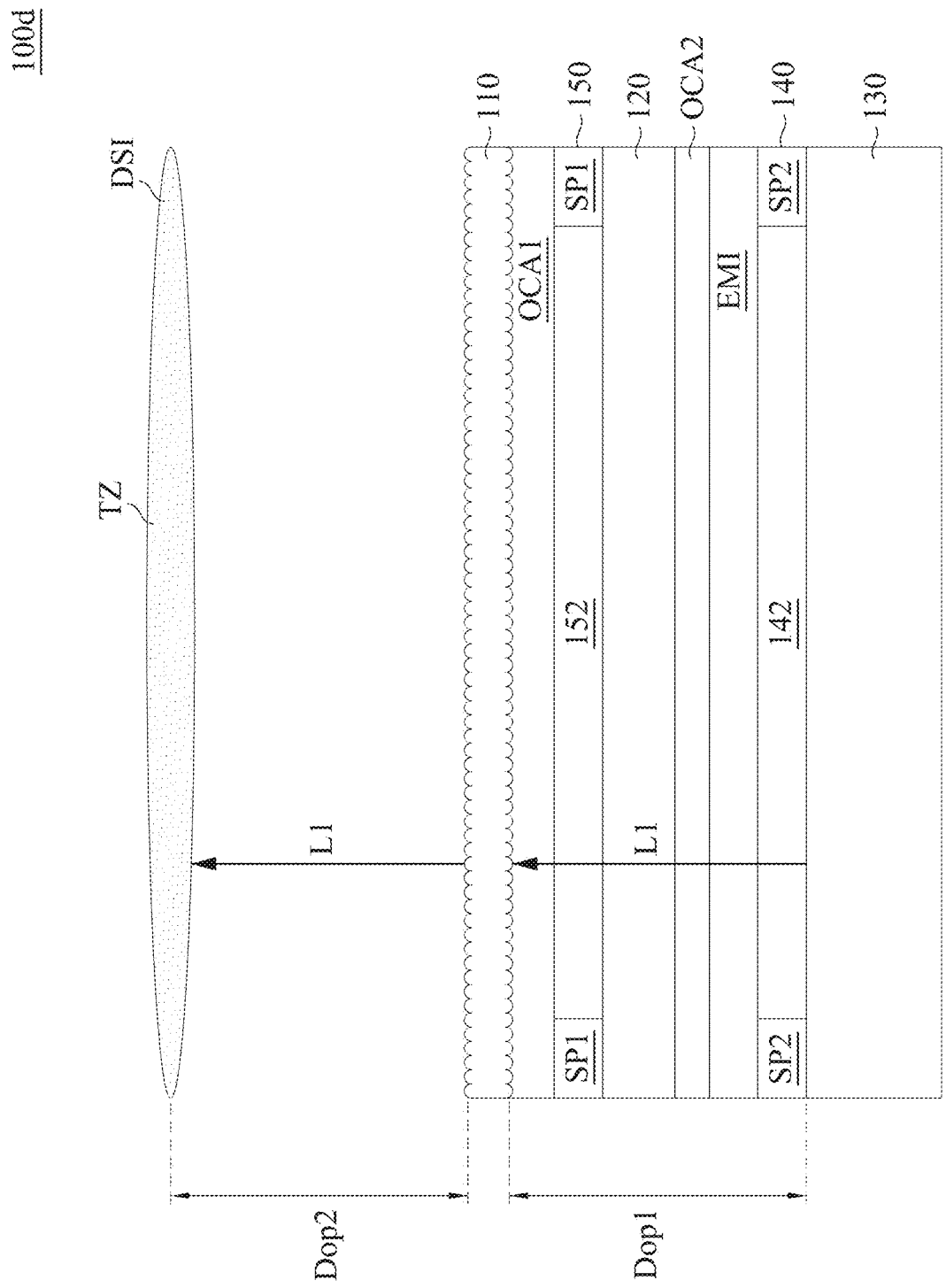

In the embodiments in FIG. 2D, the floating touch display device 100d includes an optical lens structure 110, a capacitive touch panel 120, a display device 130, optical cement layers OCA1-OCA2, an electromagnetic interference suppression layer EMI, and interval layers 140 and 150. Compared to the floating touch display device 100a of the embodiment in FIG. 2A, the difference with respect to the floating touch display device 100d of the embodiment in FIG. 2D is that, an interval layer 150 is disposed between the optical cement layer OCA1 and the capacitive touch panel 120. The interval layer 150 includes an interval structure SP, and the interval layer 140 is disposed between the optical cement layer OCA2 and the electromagnetic interference suppression layer EMI. The interval layer 150 includes an interval structure SP2, and the interval layer 140 includes an interval structure SP1.

Specifically, the interval structure SP1 is disposed along outer edges of the optical cement layer OCA1 and the capacitive touch panel 120 to form a gap 152 between the optical cement layer OCA1 and the capacitive touch panel 120. Additionally, the interval structure SP2 is disposed along outer edges of the electromagnetic interference suppression layer EMI and the display device 130 to form a gap 142 between the electromagnetic interference suppression layer EMI and the display device 130.

Since the interval layer 140 is disposed between the display device 130 and the capacitive touch panel 120 and the interval layer 150 is disposed between the capacitive touch panel 120 and the optical lens structure 110, a first optical distance Dop1 can be adjusted to be equal to a second optical distance Dop2 between the floating touch surface TZ provided by the capacitive touch panel 120 and the optical lens structure 110.

Therefore, a light L1, from the display image provided by the display surface of the display device 130, can be reflected to a position at the same height as the floating touch surface TZ by the optical lens structure 110 to generate the floating image DSI. Since the interval layers 140 and 150 can adjust the first optical distance Dop1 to be equal to the second optical distance Dop2, a size ratio of the floating image DSI and the display image can be 1:1, so as to display the original image provided by the display device 130.

The other configuration relationship and operation manner in the floating touch display device 100d are substantially equal to the floating touch display device 100a of the embodiment in FIG. 2A, and the description is omitted.

In the embodiments of FIGS. 1 and 2A to 2D, since the optical lens structure 110 is disposed above the capacitive touch panel 120, the touch sensing height may be reduces, and the floating touch sensing functions may be impacted. Additionally, the optical lens structure 110 is bare on the upper surface of the floating touch display device 100, which may be touched by user's fingers or other objects, causing damage to the optical lens structure 110. Furthermore, the surface of the optical lens structure 110 cannot be processed with anti-glare coating, anti-reflection coating, or ant-fingerprint coating. Therefore, the present disclosure provides another other floating touch display device to solve the above issues.

Figure 3:
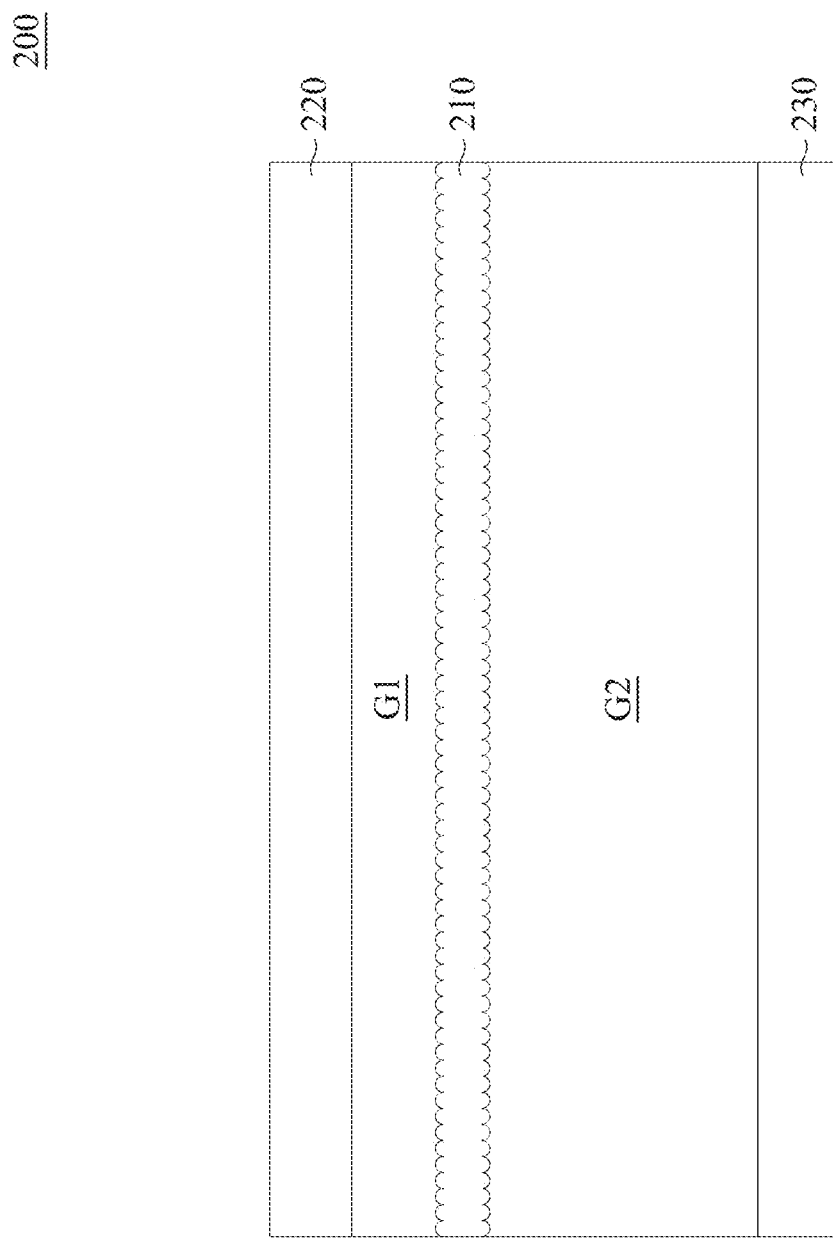
FIG. 3 is a schematic diagram of a floating touch device in accordance with one embodiment of the present disclosure.

A description is provided with reference to FIG. 3. FIG. 3 is a schematic diagram of a floating touch display device 200 in accordance with one embodiment of the present disclosure. As shown in FIG. 3, the floating touch display device 200 includes an optical lens structure 210, a capacitive touch panel 220, a display device 230, and connection layers G1 and G2. The capacitive touch panel 220 is configured to provide a floating touch surface TZ. In some embodiments, the capacitive touch panel 220 can be implemented by a projected capacitive touch panel. The architecture of the capacitive touch panel 220 can be implemented by Glass-Film-Film (GFF) technique, Film-Film (FF) technique, Glass-Glass (GG) touch technique, or One Glass Solution (OGS) technique. Therefore, it is not intend to limit the present disclosure.

In some embodiments, the display device 230 can be implemented by a display panel. In some embodiments, the aforesaid display panel can be implemented by Full HD (such as, a specification with resolution of 1920×1080/2K). In some embodiments, the aforesaid display panel can be implemented by Ultra HD (such as, a specification with resolution of 1920×1080/4K or 7680×4320/8K). Therefore, it is not intend to limit the present disclosure.

Figure 4:
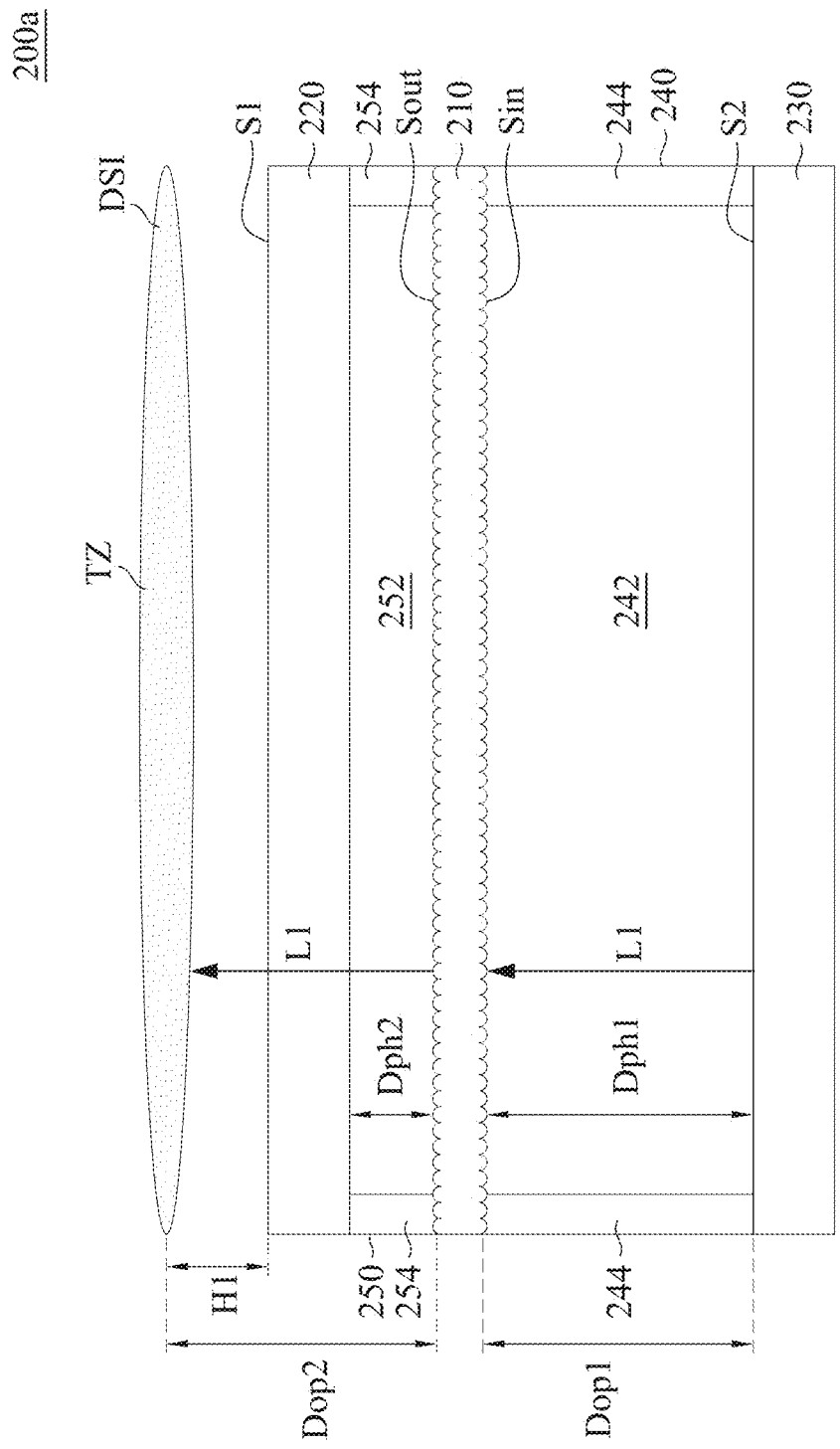
FIG. 4 is a schematic diagram of a floating touch device in accordance with one embodiment of the present disclosure.

A description is provided with reference to FIG. 4. FIG. 4 is a schematic diagram of a floating touch display device 200a in accordance with one embodiment of the present disclosure. As shown in FIG. 4, the floating touch display device 200a includes an optical lens structure 210, a capacitive touch panel 220, a display device 230, and interval layers 240 and 250.

In structure, the capacitive touch panel 220 is disposed above the optical lens structure 210. The interval layer 250 is disposed between the capacitive touch panel 220 and the optical lens structure 210, and the interval layer 240 is disposed between the optical lens structure 210 and the display device 230.

Specifically, the interval layer 250 includes an interval structure 254. In some embodiments, the interval structure 254 can be implemented by optical cement. The interval structure 254 is disposed along outer edges of the capacitive touch panel 220 and the optical lens structure 210 to form a gap 252 between the capacitive touch panel 220 and the optical lens structure 210.

The interval layer 240 includes an interval structure 244. In some embodiments, the interval structure 244 can be implemented by a support structure (such as, plastic, rubber) or optical cement. The interval structure 244 is disposed along outer edges of the optical lens structure 210 and the display device 230 to form a gap 242 between the optical lens structure 210 and the display device 230.

It should be noted that the gaps 242 and 252 formed by the interval structures 244 and 254 in the interval layers 240 and 250 can be implemented by empty spaces to improve the image quality of the floating image DSI.

A light incident surface Sin of the optical lens structure 210 faces a surface S2 of the display device 230, and a light emitting surface Sout of the optical lens structure 210 faces an opposite side of the capacitive touch panel 220 relative to a surface S1 of the capacitive touch panel 220.

In function, the capacitive touch panel 220 is configured to provide a floating touch surface TZ at a floating height H1 above the surface S1 of the capacitive touch panel 220. In some embodiments, the capacitive touch panel 220 can provide the floating touch surface TZ at the height of 3-10 centimeters, therefore the floating height H1 can be configured to be 3-10 centimeters.

The optical lens structure 210 is configured to receive a display image at the surface S2 provided by the display device 230 and is configured to image the aforesaid display image to the floating touch surface TZ at the second optical distance Dop2. Therefore, the optical lens structure 210 can image the floating image DSI in a height range which is equal to or similar with the floating touch surface TZ. In some embodiments, the aforesaid first optical distance Dop1 can be considered as an object distance of the optical lens structure 210, and the aforesaid second optical distance Dop2 can be considered as an image distance of the optical lens structure 210.

The optical lens structure 210 includes the light incident surface Sin and the light emitting surface Sout. The optical lens structure receives the light L1 from the light incident surface Sin and emits the light L1 from the light emitting surface Sout. Each of the light incident surface Sin and the light emitting surface Sout of the optical lens structure 210 includes micro-lens structures.

Figure 5A:
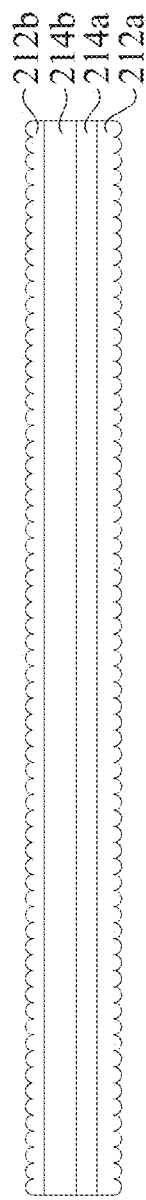
FIG. 5A is a schematic diagram of an optical lens structure in the floating touch device in FIG. 4 in accordance with one embodiment of the present disclosure.
Figure 5C:
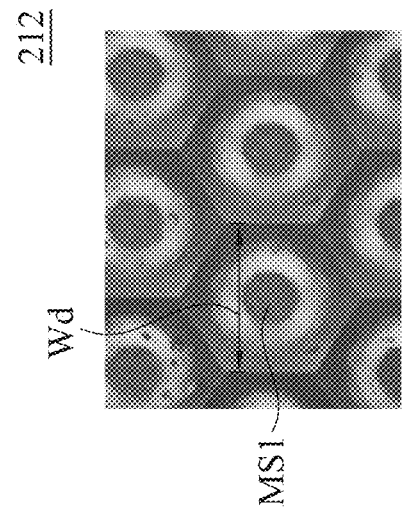
FIG. 5C is a schematic diagram of the optical film in FIG. 5A under the light illumination in accordance with one embodiment of the present disclosure.
Figure 5B:
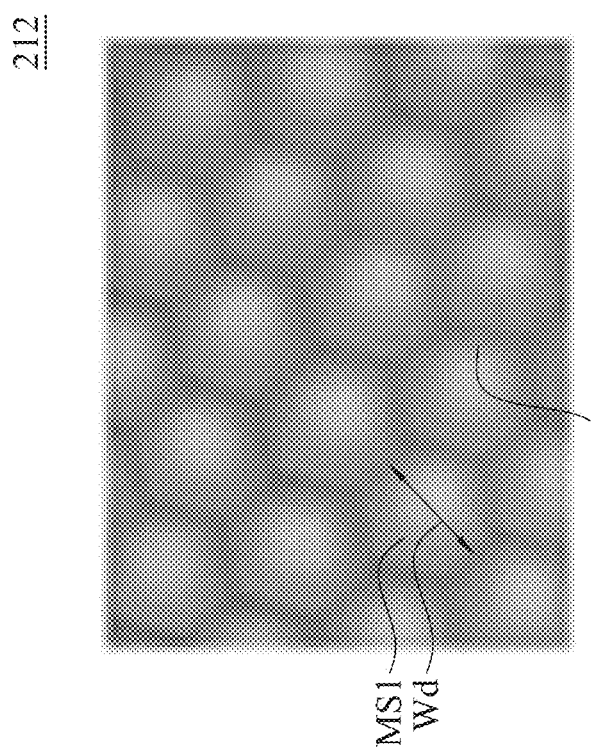
FIG. 5B is a schematic diagram of an optical film of the optical lens structure in FIG. 5A in accordance with one embodiment of the present disclosure.

For better understanding, a description is provided with reference to FIGS. 5A to 5C. FIG. 5A is a schematic diagram of an optical lens structure 210 in the floating touch display device 200a in FIG. 4 in accordance with one embodiment of the present disclosure. FIG. 5B is a schematic diagram of an optical film 212 of the optical lens structure 210 in FIG. 5A in accordance with one embodiment of the present disclosure. FIG. 5C is a schematic diagram of the optical film 212 in FIG. 5A under the light illumination in accordance with one embodiment of the present disclosure. As shown in FIG. 5A, the optical lens structure 210 includes optical films 212a, 212b and substrates 214a, 214b. The optical film 212a is disposed in the substrate 214a, and the optical film 212b is disposed in the substrate 214b.

In the embodiments of FIGS. 5B and 5C, the optical film 212 corresponds to the optical film 212a and the optical film 212b. As shown in FIG. 5B, the optical film 212 includes micro-lens structures (such as micro-lens structures MS1 and MS2), and a width Wd of each of the micro-lens structures (such as, the micro-lens structure MS1) is equal to or less than 850 micrometers.

Figure 6:
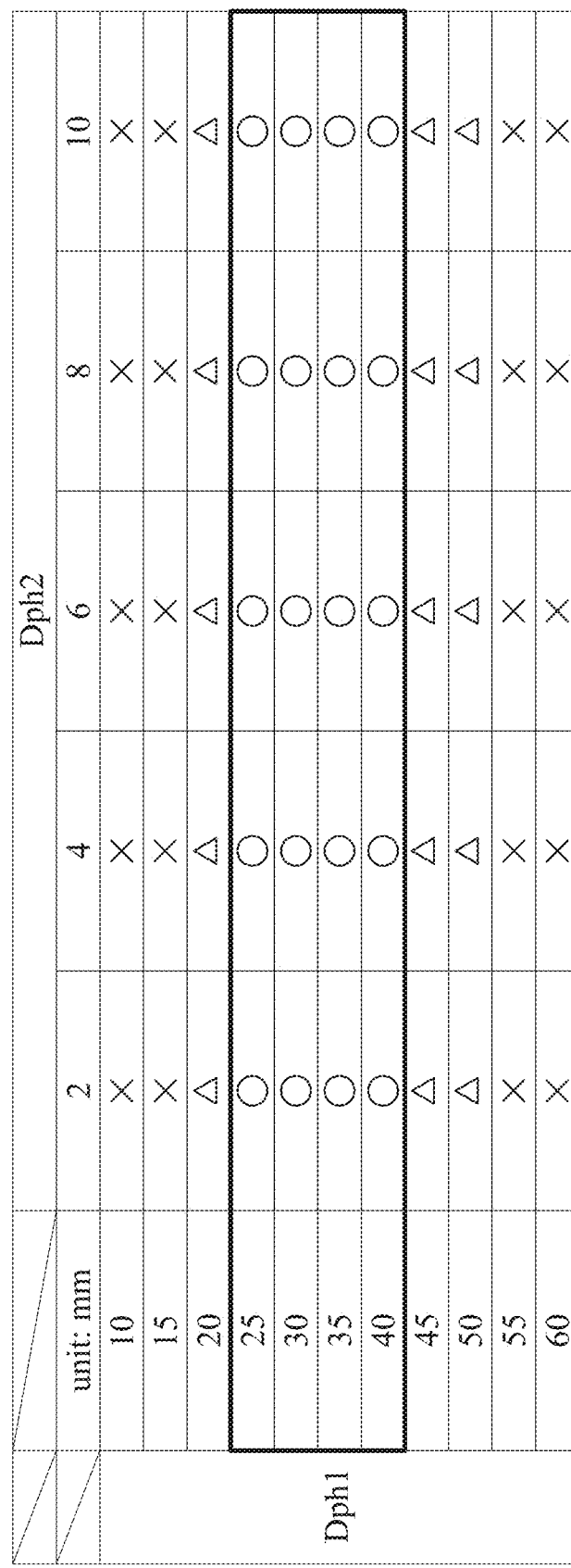
FIG. 6 is a schematic diagram of image quality of the floating touch display device in FIG. 4 under different optical distances.

A description is provided with reference to FIG. 6. FIG. 6 is a schematic diagram of image quality of the floating touch display device 200a in FIG. 4 under different optical distances. As shown in FIG. 6, in a case of the optical lens structure 210 having a specification of a width of the micro-lens structure being less than or equal to 850 micrometers, if the distance Dph1 formed by the gap 242 between the surface S2 and the optical lens structure 210 is 25-40 millimeters, the floating image DSI has a better image quality (which is represented in circle symbols). If the distance Dph1 formed by the gap 242 between the surface S2 and the optical lens structure 210 is 10-15 or 55-60 millimeters, the floating image DSI has the worst image quality (which is represented in cross symbols). If the distance Dph1 formed by the gap 242 between the surface S2 and the optical lens structure 210 is 20 or 42-50 millimeters, the floating image DSI has worse image quality (which is represented in triangle symbols) than if the distance Dph1 formed by the gap 242 between the surface S2 and the optical lens structure 210 is 25-40 millimeters but better than if the distance Dph1 formed by the gap 242 between the surface S2 and the optical lens structure 210 is 10-15 or 55-60 millimeters.

Therefore, if the gap 242 of the distance Dph1 (corresponding to the first optical distance Dop1) is configured at 25-40 millimeters, the floating image DSI has better image quality than if the gap 242 of the distance Dph1 (corresponding to the first optical distance Dop1) is configured at 10-15 or 55-60 millimeters.

On the other hand, in FIG. 6, the image quality of the floating image DSI has little relevance to the distance Dph2 between the capacitive touch panel 220 and optical lens structure. In other word, compared to the distance Dph1 between the surface S2 and the optical lens structure 210, the distance Dph2 between the optical lens structure 210 and the capacitive touch panel 220 has little relevance to the image quality.

Therefore, since the gap 242 is configured between the display device 230 and the optical lens structure 210 to form the first optical distance Dop1 at 25-40 millimeters, and the distances Dph1 of the gaps 242 can be adjusted to be equal to distances Dph2 of the gaps 252. As a result, the floating image DSI has a better image quality, and a size ratio of the floating image DSI and the display image provided by the display device 230 can be 1:1, so as to display the original image provided by the display device 230.

Figure 7A:
FIGS. 7A to 7C are schematic diagrams of image quality of the floating touch display device in FIG. 4 under different first optical distances.
Figure 7B:
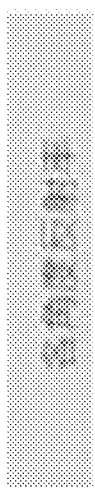
Figure 7C:
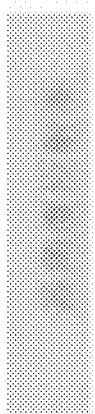

A description is provided with reference to FIGS. 7A to 7C. FIGS. 7A to 7C are schematic diagrams of image quality of the floating touch display device 200a in FIG. 4 under different first optical distances.

In embodiments in FIG. 7A, the first optical distance Dop1 is configured at 10 millimeters, and it can be seen that the floating image DSI is blurry, grainy, and has poor floating performance.

In embodiments in FIG. 7B, the first optical distance Dop1 is configured at 30 millimeters, and it can be seen that the floating image DSI is clearer and has better floating performance.

In embodiments in FIG. 7C, the first optical distance Dop1 is configured at 50 millimeters, and it can be seen that the floating image DSI still has floating performance but the image is out of focus.

Therefore, if the first optical distance Dop1 of the floating touch display device 200a is configured at 2.5 to 4 centimeters, the floating image DSI is clearer and has better floating performance.

In some embodiments, the first optical distance Dop1 can be configured to be equal to the second optical distance Dop2, such that the display image and the floating image DSI have the same size and to improve the clarity of the floating image DSI. As shown in the embodiment in FIG. 6, the height Dph1 of the interval layer 240 can be configured at 2.5 to 4 centimeters. In some embodiments, the height Dph2 of the interval layer 250 can be configured at 0.2 to 1 centimeters.

As a result, the light L1 from the display image provided by the display surface of the display device 230 can be reflected to the position with the same height with the floating touch surface TZ by the optical lens structure 210 to generate the floating image DSI. The configuration of the interval layers 240 and 250 can adjust the first optical distance Dop1 to be equal to the second optical distance Dop2, such that the ratio of the floating image DSI and the display image can be 1:1, so as to display the original image provided by the display device 230.

Figure 8:
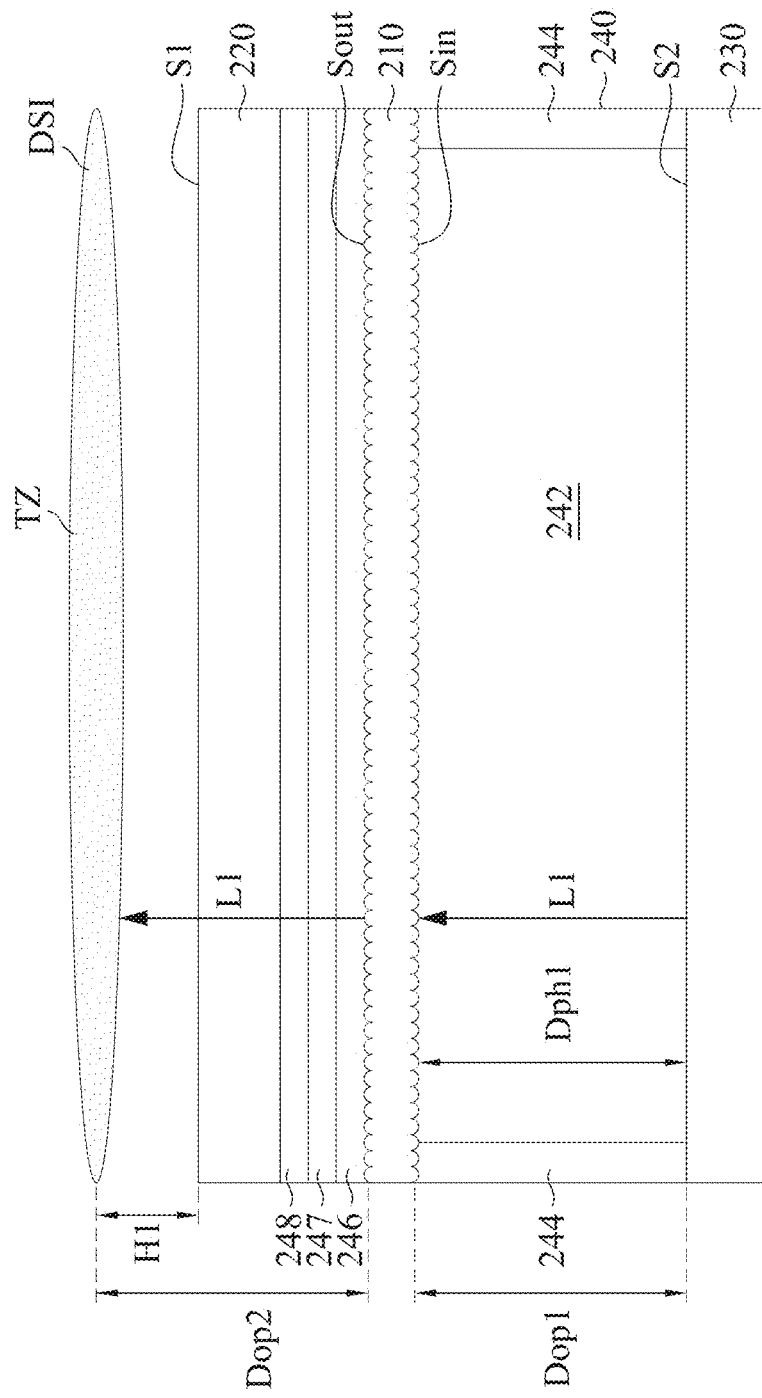
FIG. 8 is a schematic diagram of a floating touch device in accordance with one embodiment of the present disclosure.

A description is provided with reference to FIG. 8. FIG. 8 is a schematic diagram of a floating touch display device 200b in accordance with one embodiment of the present disclosure. The floating touch display device 200b includes an optical lens structure 210, a capacitive touch panel 220, a display device 230, an interval layer 240, optical cement layers 246 and 248, and an electromagnetic interference suppression layer 247.

Compared to the floating touch display device 200a in the FIG. 4, the difference with respect to the floating touch display device 200b in FIG. 8 is that the interval layer 250 is replaced by the optical cement layers 246 and 248 and the electromagnetic interference suppression layer 247.

Specifically, the electromagnetic interference suppression layer 247 is disposed between the capacitive touch panel 220 and the optical lens structure 210, so as to increase the signal-to-noise ratio of the capacitive touch panel 220. Additionally, the electromagnetic interference suppression layer 247 is attached to the capacitive touch panel 220 by the optical cement layer 248. The electromagnetic interference suppression layer 247 is attached to the optical lens structure 210 by the optical cement layer 246.

The other configuration relationship and operation manner in the floating touch display device 200b are substantially equal to the floating touch display device 200a of the embodiment in FIG. 4, and the description is omitted.

In summary, the optical lens structure 210 of the floating touch display device 200b in the present disclosure can be preferably disposed between the capacitive touch panel 220 and the display device 230, so as to improve the floating touch function and protect the optical lens structure 210 to avoid the optical lens structure 210 being damaged by touch. Furthermore, the interval layer 240 can be disposed between the optical lens structure 210 and the display device 230 of the floating touch display device 200b in the present disclosure to improve the clarity of the floating image DSI and the floating functions.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A floating touch display device, comprising:
   a capacitive touch panel comprising a first surface, wherein the capacitive touch panel is configured to provide a floating touch surface at a floating height above the first surface;
   a display device comprising a second surface, wherein the display device is configured to provide a display image at the second surface;
   an optical lens structure disposed between the capacitive touch panel and the display device; and
   an interval layer disposed between the second surface and the optical lens structure to space the second surface and the optical lens structure at a first optical distance,
   wherein the optical lens structure is configured to image the display image on the floating touch surface at a second optical distance, and the first optical distance is equal to the second optical distance.

2. The floating touch display device of claim 1, wherein the floating height is 3 to 10 centimeters.

3. The floating touch display device of claim 1, wherein the first optical distance is in a range of 2.4 to 4 centimeters.

4. The floating touch display device of claim 1, wherein the optical lens structure comprises a light incident surface and a light emitting surface, and the light incident surface and the light emitting surface comprise a plurality of micro-lens structures.

5. The floating touch display device of claim 4, wherein a width of each of the micro-lens structures is less than or equal to 850 micrometer.

6. The floating touch display device of claim 4, wherein the light incident surface of the optical lens structure faces the second surface of the display device, and the light emitting surface of the optical lens structure faces a surface of the capacitive touch panel opposite to the first surface of the capacitive touch panel.

7. The floating touch display device of claim 1, wherein the optical lens structure is configured to image the display image on the floating touch surface at the second optical distance to generate a floating image, and the first optical distance is equal to the second optical distance such that the display image and the floating image are a same size.

8. The floating touch display device of claim 1, wherein the interval layer comprises:
   an interval structure, wherein the interval structure is disposed along edges of the optical lens structure and the display device, and a gap is between the optical lens structure and the display device.

9. The floating touch display device of claim 1, further comprising:
   an electromagnetic interference suppression layer disposed between the capacitive touch panel and the optical lens structure.

10. A floating touch display device, comprising:
    a capacitive touch panel configured to provide a floating touch surface;
    a display device configured to provide a display image;
    an optical lens structure, wherein the capacitive touch panel is disposed between the optical lens structure and the display device; and
    an interval layer disposed between the display device and the optical lens structure to space the display device and the optical lens structure at a first optical distance,
    wherein the optical lens structure is configured to image the display image on the floating touch surface at a second optical distance, and the first optical distance is equal to the second optical distance.

* * * * *